(12) United States Patent
Garcia-Leiner et al.

(10) Patent No.: US 10,899,047 B2
(45) Date of Patent: Jan. 26, 2021

(54) ROTOMOLDING PROCESSES FOR POLY(ARYL KETONES) AND OTHER HIGH TEMPERATURE POLYMERS

(71) Applicant: Arkema Inc., King of Prussia, PA (US)

(72) Inventors: Manuel A. Garcia-Leiner, Baltimore, MD (US); Bruce Clay, Boyertown, PA (US)

(73) Assignee: Arkema Inc., King of Prussia, PA (US)

( * ) Notice: Subject to any disclaimer, the term of this patent is extended or adjusted under 35 U.S.C. 154(b) by 438 days.

(21) Appl. No.: 14/387,569

(22) PCT Filed: Mar. 5, 2013

(86) PCT No.: PCT/US2013/029015
§ 371 (c)(1),
(2) Date: Sep. 24, 2014

(87) PCT Pub. No.: WO2013/148081
PCT Pub. Date: Oct. 3, 2013

(65) Prior Publication Data
US 2015/0079378 A1 Mar. 19, 2015

Related U.S. Application Data

(60) Provisional application No. 61/615,468, filed on Mar. 26, 2012.

(51) Int. Cl.
*B29C 41/04* (2006.01)
*B29C 41/00* (2006.01)
(Continued)

(52) U.S. Cl.
CPC ............ *B29C 41/003* (2013.01); *B29C 41/04* (2013.01); *C08G 65/4012* (2013.01);
(Continued)

(58) Field of Classification Search
CPC ........ B29C 41/00; B29C 41/04; B29C 41/003
(Continued)

(56) References Cited

U.S. PATENT DOCUMENTS

2003/0032339 A1  2/2003 Bell et al.
2005/0051926 A1  3/2005 Guillot et al.
(Continued)

FOREIGN PATENT DOCUMENTS

IT          2 067 823 A1   6/2009
WO   WO 2011/004164 A2    1/2011

*Primary Examiner* — Jeffrey M Wollschlager
*Assistant Examiner* — Xue H Liu
(74) *Attorney, Agent, or Firm* — Lynn B. Morreale

(57) ABSTRACT

A method of manufacturing an article comprises rotomolding at least one polymer comprising a poly(aryl ketone), such as PEKK, under conditions effective to produce a rotomolded article having an impact value of at least 35 in-lbs. A rotomolding method comprises heating the mold for a period of time after the internal air temperature of the mold reaches the highest melting point of the at least one polymer. Methods also include using a PEKK powder with a bulk density of at least about 400 g/L. Rotomolded articles of the present invention have impact values of between about 40 in-lbs to about 95 in-lbs, and in particular embodiments greater than about 95 in-lbs.

13 Claims, 7 Drawing Sheets

(51) Int. Cl.
  *C08L 71/00*   (2006.01)
  *C08G 65/40*   (2006.01)
  *B29K 71/00*   (2006.01)
  *B29L 31/00*   (2006.01)

(52) U.S. Cl.
  CPC .......... *C08L 71/00* (2013.01); *B29K 2071/00* (2013.01); *B29L 2031/772* (2013.01); *C08G 2650/40* (2013.01)

(58) Field of Classification Search
  USPC ................................................ 264/310–312
  See application file for complete search history.

(56) References Cited

U.S. PATENT DOCUMENTS

| | | |
|---|---|---|
| 2008/0258330 A1 | 10/2008 | Muller et al. |
| 2008/0274360 A1 | 11/2008 | Gallucci |
| 2009/0233099 A1* | 9/2009 | Maziers .................... B32B 7/10 428/412 |
| 2009/0234060 A1 | 9/2009 | Haralur et al. |
| 2010/0144955 A1 | 6/2010 | El-Hibri et al. |
| 2011/0206880 A1 | 8/2011 | Wang et al. |
| 2014/0024787 A1 | 1/2014 | Gallucci |

* cited by examiner

Conventional Rotomolding
Sample #091214c

Optimized Rotomolding
Sample #110504b

Parent Flake (170 g/L)

Ground Flake (250 g/L)

ROTOMOLDING PROCESSES FOR POLY(ARYL KETONES) AND OTHER HIGH TEMPERATURE POLYMERS

CROSS-REFERENCE TO RELATED APPLICATIONS

This application is a national stage application under 35 U.S.C. § 371 of PCT/US2013/029015, filed Mar. 5, 2013, which claims benefit to U.S. patent application 61/615,468 filed on Mar. 26, 2012.

FIELD OF THE INVENTION

The present invention relates to articles comprising poly (aryl ketones), such as poly(etherketoneketone) (PEKK), and methods of making them by using a rotomolding process.

BACKGROUND OF THE INVENTION

High temperature thermoplastic polymers, such as poly (aryl ketones), are continuously being evaluated as options in a multitude of applications, including aerospace and oil and gas exploration. In particular, several aerospace companies have identified various potential applications for poly(etherketoneketone) (PEKK) parts. PEKKs feature exceptional characteristics, including high-temperature and chemical resistance, very good mechanical properties, excellent abrasion resistance, and natural flame retardancy. Specifically, aerospace companies have identified various potential applications for PEKK parts that have been fabricated by rotational molding (also referred to as rotomolding or rotational cast molding), particularly in fabricating air ducts and other parts with complex geometries. Historically, a desirable impact value for rotomolded PEKK parts in aerospace applications has been identified to be approximately 35 in-lbs.

The process of rotomolding is a fast-growing plastics processing method. Rotomolding provides an efficient and economical alternative to other plastics processing techniques, such as blow molding, injection molding, and thermoforming. Historical data, however, have revealed unsuccessful results from rotomolding attempts with PEKK. These results have shown that the impact performance in PEKK parts produced by conventional rotomolding is insufficient, displaying brittle failure after impact, and impact resistance levels below 35 in-lbs when measured in specimens with about 0.050" thickness. There remains a need for rotomolding processes that can produce materials that satisfy the impact requirement (35 in-lbs) suggested by aerospace companies and that display an improved appearance compared to high temperature thermoplastic polymers made by conventional rotomolding processes.

SUMMARY OF THE INVENTION

Figure 1:
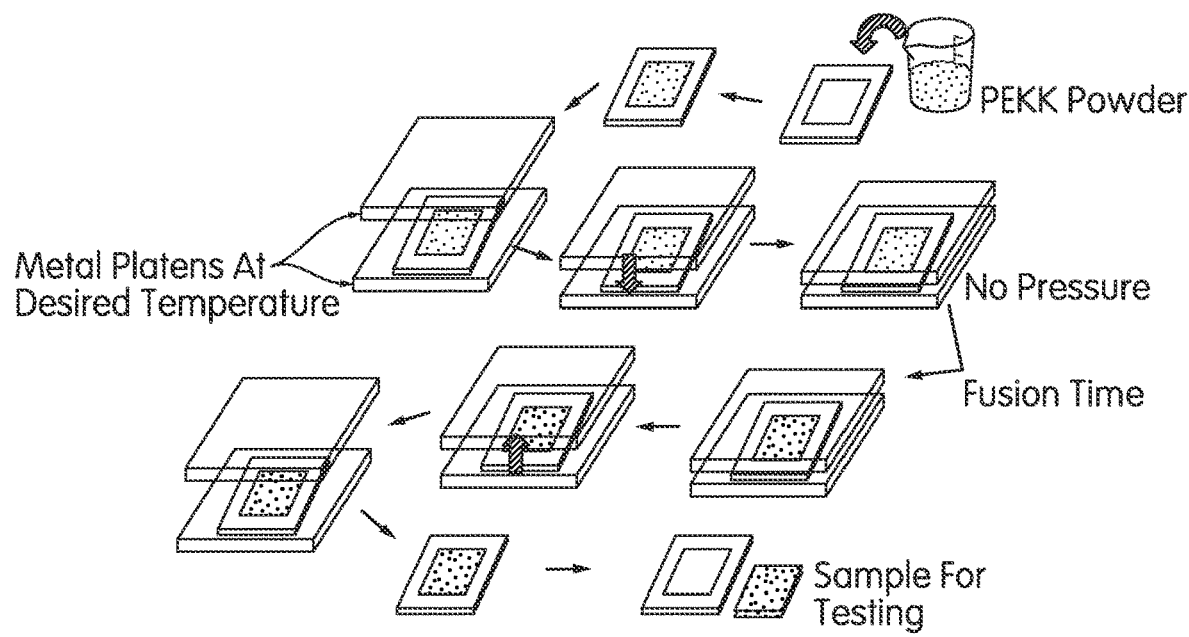
FIG. 1 illustrates a melt molding process to produce "stress-free" PEKK samples for impact testing.

The present invention provides articles comprising a poly(aryl ketone), such as poly(etherketoneketone) (PEKK), and associated methods of making the same by using rotomolding processes.

A desirable minimum impact value for rotomolded PEKK parts in applications such as aerospace has been identified to be approximately 35 in-lbs. According to an embodiment of the present invention, a method of manufacturing an article comprises rotomolding at least one polymer comprising a poly(aryl ketone), such as PEKK, under conditions effective to produce a rotomolded article having an impact value of at least 35 in-lbs.

According to one embodiment, a rotomolding method of the present invention comprises heating the mold for a period of time after the internal air temperature of the mold reaches the highest melting point of the at least one polymer. In one embodiment, the internal air temperature of the mold is maintained above about 550° F. (288° C.) for at least about 10 minutes.

According to particular embodiments, the polymer powder has a bulk density of at least about 400 g/L (e.g., between about 400 g/L to about 700 g/L). Optionally, one or more flow agents and/or one or more mold release agents may be added to the mold.

According to another embodiment of the present invention, a rotomolded article comprising at least one polymer comprising a poly(aryl ketone) has an impact value of between about 40 in-lbs to about 95 in-lbs. Rotomolded articles having impact values above 95 in-lbs are also contemplated by the present invention. Articles produced via rotomolding methods of the present invention would find wide application in aerospace and aircraft, as well as oil and gas exploration, especially in ducting and fabrication of parts with complex geometries.

Another embodiment of the present invention is directed to rotomolded articles having a thickness and impact value and comprising, consisting essentially of, or consisting of poly aryl ketones (e.g., PEKK, PEEK, PEK, and PEKEKK). Another embodiment of the present invention is directed to the rotomolded poly aryl ketone article, wherein the ratio of impact value (in in lbs) to thickness (in inches) ("R") of the rotomolded article is at least about 500, preferably at least about 600, more preferably at least about 700, more preferably at least about 800, even more preferably at least about 900, even more preferably at least about 1000, even more preferably at least about 1500, or greater. For example, in one embodiment the rotomolded article comprises, consists essentially of, or consists of PEKK, has an impact value of 35 in lbs, a thickness of 0.05 inches and an R value of 700 (35 divided by 0.05).

DETAILED DESCRIPTION OF THE INVENTION

Rotomolding represents an alternative to melt processing techniques for high temperature polymers and high performance engineering thermoplastics. These include poly(aryl ketones) (such as PEKK, PEEK, PEK, and PEKEKK), in addition to other high temperature polymers such as polyimides, PPS, and high temperature polyamides. The limited processability of these polymers, in addition to their high temperature requirements during processing, make rotomolding an important alternative for the fabrication of materials used in a variety of high-end applications.

The applicants have developed novel methods for the rotomolding of poly(aryl ketones), such as poly(etherketoneketone) (PEKK), which produce parts with increased aesthetics and improved impact resistance. Methods of the present invention include using particular temperature profiles and additional processing conditions that favor the development of enhanced properties in the final rotomolded parts.

A desirable minimum impact value for rotomolded PEKK parts in applications such as aerospace has been identified to be approximately 35 in-lbs. However, the impact performance in PEKK parts produced by conventional rotomolding has been insufficient, displaying brittle failure after impact, and impact resistance levels below 35 in-lbs when measured in specimens with about 0.050" thickness. As described below, parts produced using rotomolding methods of the present invention reveal impact values at least twice that value; for example, at about 75 in-lbs when measured in specimens with about 0.050" thickness. The present invention contemplates rotomolded articles having impact values greater than 75 in-lbs (e.g., between about 75 in-lbs to about 95 in-lbs), as well as rotomolded articles having impact values greater than 95 in-lbs. In addition, parts produced by methods of the present invention reveal a ductile failure, as opposed to a traditional brittle failure commonly observed in rotomolded parts produced from PEKK, other poly(aryl ether ketones), and similar high temperature polymers (PPS, PEI, etc). This behavior is highly desirable in high end applications such as aerospace.

As used herein, the term "article" may be used interchangeably with "part" or "object." Articles of the present invention may comprise, for example, air ducts or other specialized parts of intricate geometry, with potential applications including but not limited to aerospace, aircraft, oil and gas, electronics, building and construction, ducting, and high temperature containers, among others.

"Rotomolding" (also referred to as rotational molding or rotational cast molding), as used herein and in the art, comprises placing a quantity of a powder, which comprises at least one polymer and other optional components, into a mold having the desired geometry of the final article. The mold is then closed and rotated, preferably around two primary axes, while being heated to distribute the polymer powder over the inside surface of the mold as it goes through its melting process. The peak or maximum internal air temperature of the mold is controlled by adjusting the oven temperature and mold residence time in the oven. An inert gas could also be introduced into the mold before or during the molding cycle. The heating of the mold and polymer powder is also referred to as a "heating cycle." The heating cycle may begin before or after the rotating of the mold is initiated. Once the polymer is distributed substantially evenly over the surface of the mold, the "cooling cycle" is initiated, which comprises applying a water spray and/or an air flow to cool down the mold and solidify the polymer(s) and other optional components into the final rotomolded article. The rotomolded article is recovered during a discharging step, where the rotation is stopped, the mold is opened, and the article is removed. Rotomolding differs in many respects from melt molding techniques, such as blow and injection molding, in which one or more polymers are forced under pressure into molds in a molten state.

As used herein, the "powder" that is rotomolded (also referred to as a "starting powder," "parent powder," or "polymer powder") refers to any type of solid particles, including but not limited to granules, chips, pellets, or flakes. The form of the powder is not particularly limited and may be selected by one of ordinary skill in the art.

As used herein, each compound may be discussed interchangeably with respect to its chemical formula, chemical name, abbreviation, etc. For example, PEKK may be used interchangeably with poly(etherketoneketone). Additionally, each compound described herein, unless designated otherwise, includes homopolymers and copolymers. The term "copolymers" is meant to include polymers containing two or more different monomers and can include, for example, polymers containing two, three or four different repeating monomer units.

As used herein and in the claims, the terms "comprising" and "including" are inclusive or open-ended and do not exclude additional unrecited elements, compositional components, or method steps. Accordingly, the terms "comprising" and "including" encompass the more restrictive terms "consisting essentially of" and "consisting of."

According to an aspect of the present invention, a method of manufacturing an article comprises rotomolding at least one polymer comprising a poly(aryl ketone) under conditions effective to produce a rotomolded article having an impact value of at least 35 in-lbs. As discussed in more detail below, the "conditions effective" to produce a rotomolded article of the present invention include the use of particular temperature profiles during rotomolding, and may optionally include particular bulk densities of the parent powder, and the addition of one or more flow agents and/or mold release agents. The impact value of a rotomolded article of the present invention is measured on a rotomolded article having a thickness of 0.05" according to ASTM D5420 ("Standard Test Method for Impact Resistance of Flat, Rigid Plastic Specimen by Means of a Striker Impacted by a Falling Weight (Gardner Impact) using a BYK Gardner Heavy Duty Impact Tester, Model No. 1120 Impact value is determined using ASTM D5420, Geometry GE with the following exception: in section 7.1.2, the geometry of the striker is stated to be a round nose striker with a diameter of 0.5 inches. Instead of a round nose striker, a BYK Gardner 3 sided punch, part no. 1227, is used (referred to as the striker in ASTM D5420).

The "at least one polymer" that is rotomolded comprises, consists essentially of, or consists of at least one poly(aryl ketone), preferably PEKK. Poly(aryl ketones) are intended to encompass all homopolymers and copolymers (including e.g., terpolymers) and the like. In one embodiment, the poly(aryl ketone) is selected from the group consisting of polyetherketoneketone (PEKK), polyetheretherketone (PEEK), polyetherketone (PEK), polyetherketoneetherketoneketone (PEKEKK), and mixtures thereof. The parent powder may optionally include more than one poly(aryl ether ketone).

In an exemplary embodiment, the poly(aryl ketone) comprises, consists is essentially of, or consists of polyetherketoneketone (PEKK). Polyetherketoneketones suitable for use in the present invention may comprise or consist essentially of repeating units represented by the following formulas I and II:

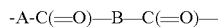  I

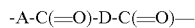  II where A is a p,p'-Ph-O-Ph- group, Ph is a phenylene radical, B is p-phenylene, and D is m-phenylene. The Formula I:Formula II (T:I) isomer ratio in the polyetherketoneketone can range from 100:0 to 0:100. The isomer ratio may be easily varied as may be desired to achieve a certain set of properties, e.g., by varying the relative amounts of the different monomers used to prepare the polyetherketoneketone. Generally speaking, a polyetherketoneketone having a relatively high Formula I:Formula II ratio will be more crystalline than a polyetherketoneketone having a lower Formula I:Formula II ratio. Thus, the T:I ratio may be adjusted so as to provide an amorphous (non-crystalline) polyetherketoneketone or a more crystalline polyetherketoneketone, as desired. In one embodiment, a polyetherketoneketone having a T:I isomer ratio of from about 50:50 to about 90:10 may be employed.

For example, the chemical structure for a polyetherketoneketone with all para-phenylene linkages [PEKK(T)] may be represented by the following formula III:

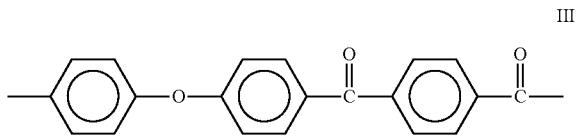  III

The chemical structure for a polyetherketoneketone with one meta-phenylene linkage in the backbone [PEKK(I)] may be represented by the following formula IV:

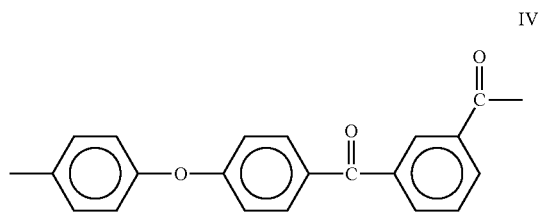  IV

The chemical structure for a polyetherketoneketone with perfectly alternating T and I isomers, e.g., a homopolymer having 50% chemical compositions of both T and I [PEKK (T/I)] may be represented by the following formula V:

The poly(aryl ketones) may be prepared by any suitable method, which is well known in the art. For example, a poly(aryl ketone) may be formed by heating a substantially equimolar mixture of at least one bisphenol and at least one dihalobenzoid compound or at least one halophenol compound. The polymer may be amorphous or crystallized, which can be controlled through synthesis of the polymer. Additionally, the polymer(s) may also be of any suitable molecular weight and may be functionalized or sulfonated, if desired. In one embodiment, the polymer(s) undergo sulfonation or any example of surface modification known to one skilled in the art.

Suitable polyetherketoneketones are available from several commercial sources under various brand names. For example, polyetherketoneketones are sold under the brand name OXPEKK™ polymers by Oxford Performance Materials, Enfield, Conn., including OXPEKK™-C, OXPEKK™-CE, OXPEKK™-D and OXPEKK™-SP polymers. Polyetherketoneketone polymers are also manufactured and supplied by Arkema.

The parent powder may include other polymers, in addition to the poly(aryl ketone). In one embodiment, the other polymers share similar melting points, melt stabilities, etc. and are compatible by exhibiting complete or partial miscibility with one another. In particular, other polymers exhibiting mechanical compatibility with the poly(aryl ketone) may be added to the composition. It is also envisioned, however, that the polymers need not be compatible with the poly(aryl ketone). The other polymers may include, for example, polyamides (such as polyamide 11 and polyamide 12 commercially available from Arkema under the name Rilsan, poly(hexamethylene adipamide) or poly(ε-caproamide)); fluorinated polymers (such as PVDF, PTFE and FEP); polyimides (such as polyetherimide (PEI), thermoplastic polyimide (TPI), and polybenzimidazole (PBI)); polysulfones/sulfides (such as polyphenylene sulfide (PPS), polyphenylene sulfone (PPSO$_2$), polyethersulfone (PES), and polyphenylsulfone (PPSU)); poly(aryl ethers); and polyacrylonitrile (PAN). In one embodiment, the other polymers include polyamide polymers and copolymers, polyimide polymers and copolymers, etc. Polyamide polymers may be particularly suitable in high temperature applications. The additional polymers may be blended with the poly(aryl ketone) by conventional methods.

The parent powder may also include additional component(s), such as filler(s) or additive(s), to achieve specific properties desirable in a particular application, such as core-shell impact modifiers; fillers or reinforcing agents, such as glass fibers; carbon fibers; plasticizers; pigments or dyes; thermal stabilizers; ultraviolet light stabilizers or absorbers; antioxidants; processing aids or lubricants; flame retardant synergists, such as Sb$_2$O$_3$, zinc borate, and the like; or mixtures thereof. These components may optionally be present, for example, in an amount of about 0.1 weight percent to about 70 weight percent based on the total weight

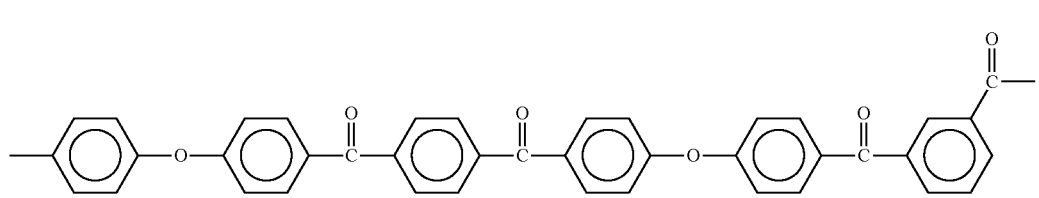  V of the powder composition. As previously discussed, the powder may include additional polymers.

Suitable fillers that may be added to the mold include fibers, powders, flakes, etc. For example, fillers may include at least one of carbon nanotubes, carbon fibers, glass fibers, polyamide fibers, hydroxyapatite, aluminum oxides, titanium oxides, aluminum nitride, silica, alumina, barium sulfates, graphene, graphite, etc. The size and shape of the fillers are also not particularly limited. Such fillers may be optionally present in an amount of from about 0.1 weight percent to about 70 weight percent.

Rotomolding methods of the present invention are based, in part, on the manipulation of the temperature profile to maximize the exposure of the poly(aryl ketone) to high temperature. As shown, for example, in FIG. 4, a conventional temperature profile in rotomolding begins with a heating cycle, during which time the polymer is gradually heated. The air temperature inside the mold is increased gradually, and during the rotation and heating cycle the temperature of the polymer increases above its glass transition (Tg) and melting point (Tm) for the case of semi-crystalline materials. Almost immediately after the internal air temperature of the mold reaches the melting point of the polymer(s), the heating cycle is stopped and the cooling cycle is initiated, causing the internal air temperature of the mold to drop substantially.

The applicants have discovered that temperature profiles (e.g., heating and cooling cycles) can be controlled and tuned to enhance the impact properties and appearance of a rotomolded part. Maximizing the exposure of a powder comprising a poly(aryl ketone), particularly a PEKK powder, to high temperatures during rotomolding promotes increases in the final impact properties and in the overall appearance.

According to one embodiment, a rotomolding method of the present invention comprises heating the mold for a period of time after the internal air temperature of the mold reaches the highest melting point of the at least one polymer. Instead of stopping the heating cycle and initiating the cooling cycle immediately (or almost immediately) after the internal air temperature of the mold reaches the melting point of the polymer(s), the heating cycle is maintained for an additional period of time prior to initiating the cooling cycle. In the event that more than one polymer is included in the parent powder, the heating cycle is preferably maintained after the internal air temperature of the mold reaches the melting point of the polymer that has the highest melting point (i.e., the highest melting point of the at least one polymer). If only one polymer is included in the parent powder, the mold is heated for a period of time after the internal air temperature of the mold reaches the melting point of the one polymer. Examples of temperature profiles according to methods of the present invention using PEKK, compared to a melt molding process, are provided in FIG. 6.

According to particular embodiments, the mold is heated for at least about 5 minutes, at least about 10 minutes, at least about 20 minutes, or at least about 30 minutes after the internal air temperature of the mold reaches the highest melting point of the at least one polymer, prior to initiating the cooling cycle. In preferred embodiments the heating cycle is maintained for between about 5 minutes to about 45 minutes, between about 10 minutes to about 40 minutes, or preferably for between about 20 minutes to about 30 minutes after the internal air temperature of the mold rises above the highest melting point of the polymer(s), prior to initiating the cooling cycle. Depending on their chemical structure, for example, PEKK polymers and copolymers display melting points below 400° C. (752° F.), ranging from around 300° C. (572° F.) to around 380° C. (716° F.).

According to one embodiment, a method of the present invention comprises maintaining the internal air temperature of the mold within about 75° F. (42° C.) of the highest melting point of the polymer(s) (i.e., within about 75° F., 42° C. above and/or below the highest melting point) for a period of time after the internal air temperature of the mold reaches the highest melting point of the at least one polymer. Alternatively, by manipulating the oven temperature and mold heating duration the internal air temperature of the mold is maintained within about 60° F. (33° C.), about 50° F. (28° C.), about 40° F. (22° C.), about 30° F. (17° C.), about 20° F. (11° C.), or about 10° F. (6° C.) of the highest melting point of the polymer(s) for a period of time after the internal air temperature of the mold reaches the highest melting point of the at least one polymer.

According to particular embodiments, a method of the present invention comprises maintaining the internal air temperature of the mold at above 550° F. (288° C.) for at least about 10 minutes, at least about 15 minutes, or at least about 20 minutes. According to another embodiment, the internal air temperature of the mold is maintained at above 550° F. (288° C.) for between about 15 minutes to about 45 minutes, or between about 20 minutes to about 40 minutes. Other embodiments of the present invention comprise maintaining the internal air temperature of the mold at above 600° F. (315° C.) for at least about 10 minutes, at least about 15 minutes, or at least about 20 minutes, or between about 20 minutes to about 30 minutes. In another embodiment, the internal air temperature of the mold is maintained between about 620° F. (327° C.) to about 660° F. (349° C.) for between about 10 minutes to about 20 minutes. The internal air temperature is preferably maintained below temperatures at which the polymer(s) being rotomolded begin to experience significant degradation; for example, for PEKK this is generally 752° F. (400° C.).

The applicants have also discovered that the bulk density of the parent powder is an important parameter for improving the wall coverage and overall properties of a rotomolded part. According to one embodiment, a method of manufacturing an article comprises rotomolding a powder comprising ground pellets of a poly(aryl ketone) (preferably PEKK) that have a bulk density greater than about 250 g/L. According to other embodiments, the powder comprising ground pellets of a poly(aryl ketone) (preferably PEKK) have a bulk density greater than about 300 g/L, greater than about 350 g/L, greater than about 400 g/L, greater than about 450 g/L, greater than about 500 g/L, greater than about 550 g/L, greater than about 600 g/L, or greater than about 650 g/L. According to particular embodiments, the powder comprises ground pellets of a poly(aryl ketone) (preferably PEKK) that have a bulk density of between about 250 g/L to about 700 g/L, between about 400 g/L to about 700 g/L, or between about 400 g/L to about 600 g/L. For example, according to particular embodiments, the powder comprises ground pellets of a poly(aryl ketone) (preferably PEKK) that have a bulk density of at least about 400 g/L, between about 400 g/L to about 500 g/L, between about 400 g/L to about 450 g/L, or between about 400 g/L to about 410 g/L.

According to alternative embodiments, one or more flow agents and/or one or more mold release agents can be applied to the mold surface prior to rotomolding. Examples of preferred mold release agents include Chemtrend® E-331 and Freekote® 770-NC.

Figure 13:
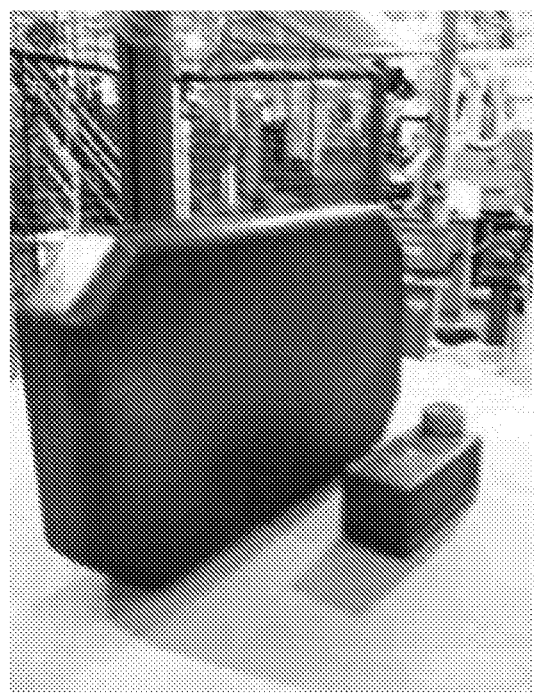
FIG. 13 shows a large PEKK part obtained with a rotomolding process of the present invention (dimensions: large part 24"×15"×4"; small part 8"×3.5"×3.5").

An embodiment of the present invention provides a rotomolded article comprising at least one polymer comprising or consisting of a poly(aryl ketone) (preferably PEKK), wherein the rotomolded article has an impact value of greater than 35 in-lbs. According to particular embodiments, the rotomolded article has an impact value of between about 40 in-lbs to about 95 in-lbs (e.g., between about 40 in-lbs to about 75 in-lbs) and a thickness of about 0.05" to about 0.06". The present invention contemplates rotomolded articles having impact values greater than 75 in-lbs (e.g., between about 75 in-lbs to about 95 in-lbs), as well as rotomolded articles having impact values greater than 95 in-lbs. Examples of rotomolded articles of the present invention are shown in FIG. 13, in which a smaller rotomolded article has dimensions of about 8"×3.5"×3.5" and a larger rotomolded article has dimensions of about 24"×15"×4".

The following examples are provided to describe properties and embodiments of the invention in greater detail and are intended to illustrate, not limit, the invention.

EXAMPLES

Example 1

Properties of "Stress-Free" Melt Molded PEKK Samples

In order to understand the ability of PEKK to deliver the required impact performance (35 in-lbs for 0.050" thick specimens) a process for the production of "stress-free" samples was developed. The process is based on melt molding of PEKK polymer powders under a constrained geometry (dictated by a mold) without the application of a normal pressure (which is normally used in plastics melt molding techniques) to allow free flow of the polymer melt and reduce internal stresses created in the molding process. The process is depicted in FIG. 1.

Figure 2:
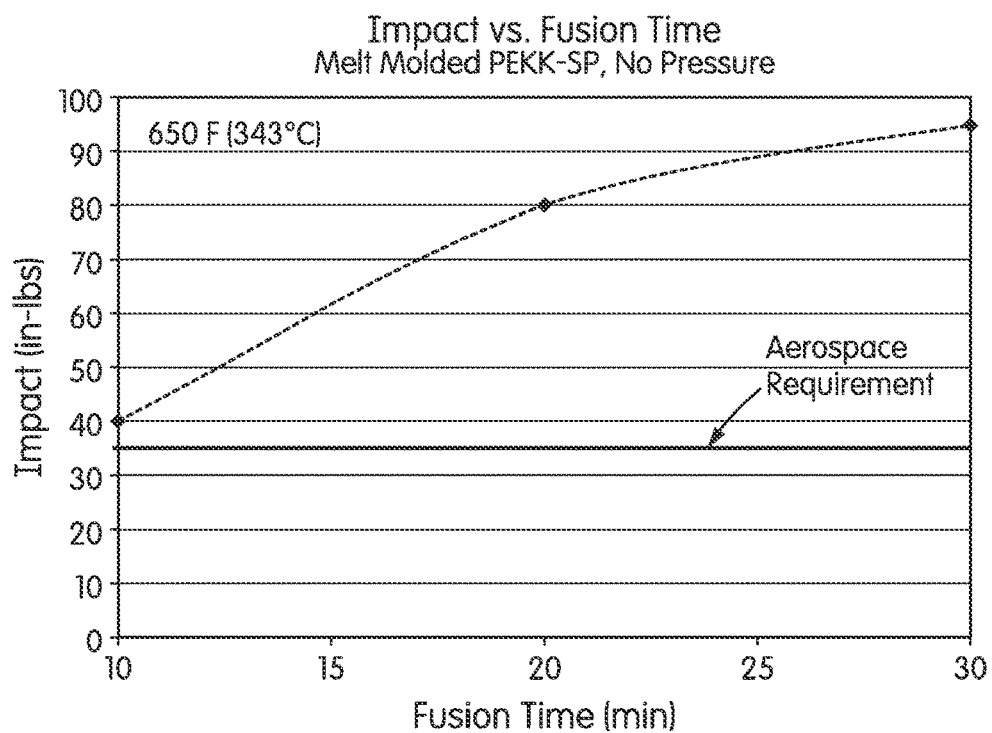
FIG. 2 illustrates impact properties of "stress-free" PEKK samples at various fusion times (molded at 650° F., 343° C. OXPEKK™ SP lot M166).

Using this method, specimens were produced at various fusion times and the resulting impact strength was measured in 0.05" samples. Results revealed that "stress-free" PEKK samples produced with OXPEKK SP lot M166 achieve the desired impact level (35 in-lbs) after only 10 minutes of fusion. As shown in FIG. 2, samples produced with longer fusion times (20, 30 minutes) displayed significantly enhanced impact properties, displaying values close to 3× the desired requirement. Overall, these results suggested that PEKK is capable of delivering the required impact performance for high end applications.

Experiments were also conducted with low viscosity (high MVI) PEKK powders (Arkema PEKK SP P500, Lot P11SP009) Impact performance of "stress-free" samples produced with this grade using the melt molding process described above (compression molding without pressure) indicate that a reduced viscosity does not necessarily lead to higher impact performance during the same fusion time.

Figure 3:
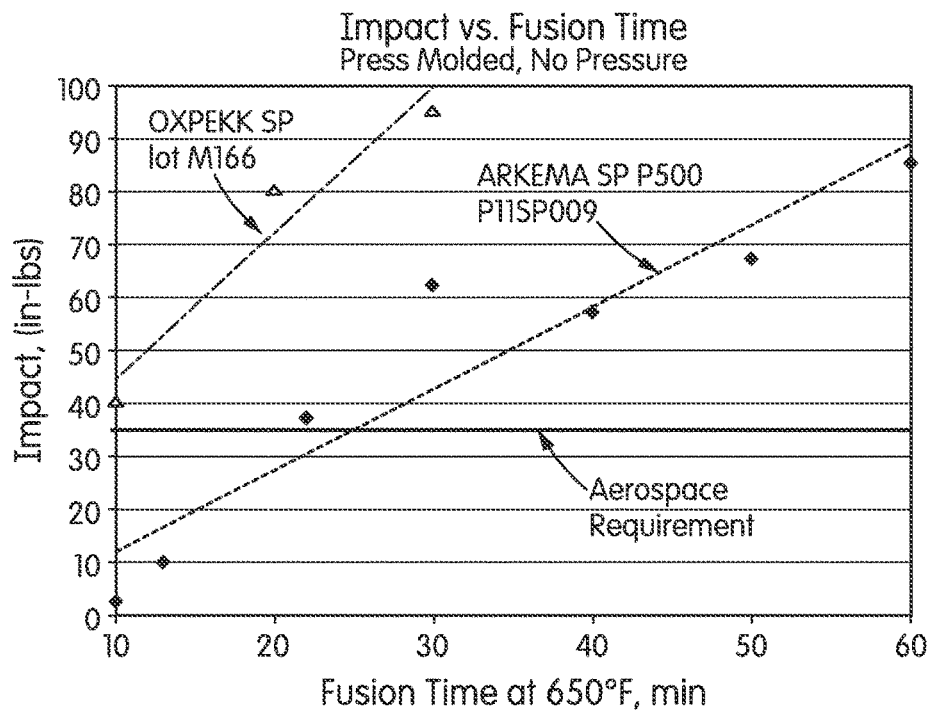
FIG. 3 compares impact properties of "stress-free" PEKK samples having different viscosities at various fusion times (molded at 650° F., 343° C.).

As seen in FIG. 3, impact data suggest differences between Arkema-produced PEKK SP P500 (Lot P11SP009) and the more viscous powder described before (OXPEKK™ SP lot M166). Despite its low viscosity, lot P11SP009 requires larger fusion times to achieve an impact level above 35 in-lbs. Data in FIG. 3 show that after 20 minutes, a value of 37 in-lbs is obtained in this sample, which is relatively low compared that obtained with the OXPEKK™ SP lot M166 resin (close to 80 in-lbs).

In both cases, larger fusion times promote higher levels of impact and a value above 85 in-lbs is achieved in Arkema PEKK SP P500, Lot P11SP009 after 60 minutes. These results indicate overall that additional physical properties of the powder (e.g., particle size and bulk density) contribute to the final impact performance of a PEKK part produced with this method. These results suggested that additional physical properties should also contribute to the final impact performance of PEKK parts produced by rotomolding.

Example 2

Rotomolding Conditions

Methods described herein were conducted in a S.T.P. Lab 40 Rotomolding machine equipped with air and water cooling systems. The unit has high temperature capabilities with a maximum oven temperature of 700° F. (close to 370° C.). For this unit, rotation is available in two axes with specific computer control and data acquisition capabilities.

Initial fusion tests revealed the possibility of rotomolding PEKK at temperatures close to 625° F. (329° C.). In these experiments, small samples of PEKK powder were placed in an oven at constant temperature for a short period of time, typically around 5 minutes. Results suggested that higher temperatures (close to 650° F., 343° C.) promoted full melting of the powder, while insufficient melting and powder fusion was observed at lower temperatures (close to 600° F., 315° C.). At these conditions, a temperature close to 625° F. (329° C.) appeared to provide appropriate levels of powder interaction that would be favorable during a rotomolding process.

PEKK powders are in general highly viscous. The use of a mold release agent is a common practice when dealing with high viscosity resins. However, care must be taken since excessive amounts of mold release might result in parts with poor or insufficient impact performance. Some examples of the commercial mold release agents used in this study include Chemtrend® E-331 and Freekote® 770-NC.

Optimization of the rotomolding process is required for the case of high viscosity, high temperature polymers. In the case of PEKK, optimization of the process included several parameters. As described in detail below, powder properties are very important for the improvement of the aesthetics of a rotomolded part. In addition to this, increasing the bulk density of the powder has a direct effect on the overall impact performance of the resulting part. Rotomolding processes of the present invention preferably include the use of a powder with appropriate bulk density, particle shape, and particle size distribution. High impact results have been obtained with rotomolded parts obtained from parent powders with a bulk density above approximately 400 g/L.

Figure 4:
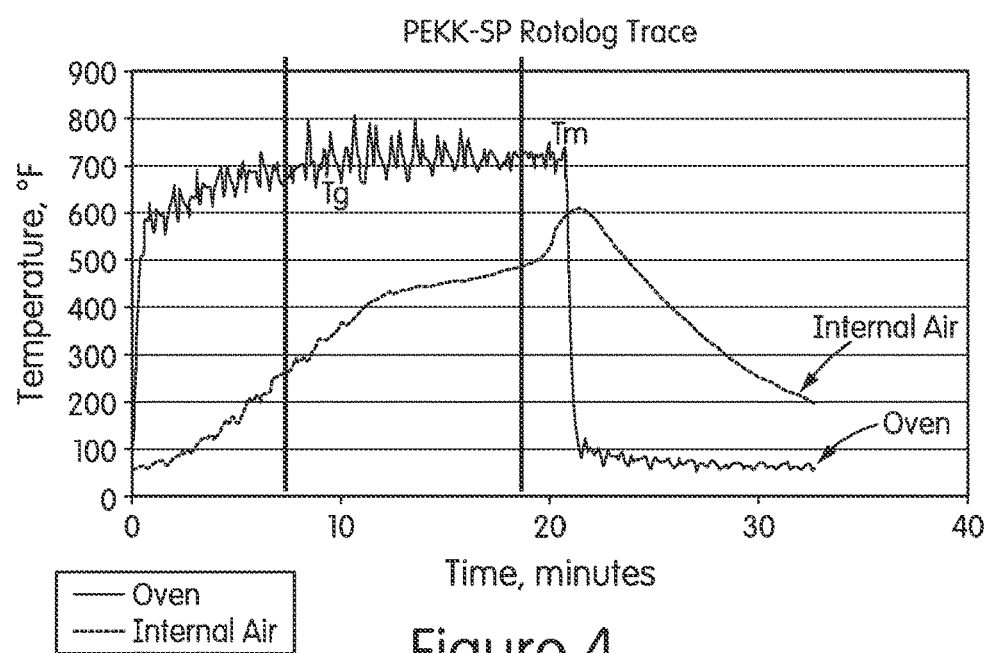
FIG. 4 illustrates a traditional temperature profile for PEKK rotomolding.

As described above, rotomolding processes described in this invention are based, in part, on manipulation of the temperature profile to maximize the exposure of the poly (aryl ketone) powder to high temperature. A traditional temperature profile in rotomolding includes a gradual heating of the part, in which the heating rate is dictated by the selected oven temperature. The air temperature inside the mold is increased gradually, and during the rotation and heating process the temperature of the polymer increases above its glass transition (Tg) and melting points (Tm) for the case of semi-crystalline materials. For PEKK, a traditional rotomolding temperature profile is shown in FIG. 4.

Figure 5:
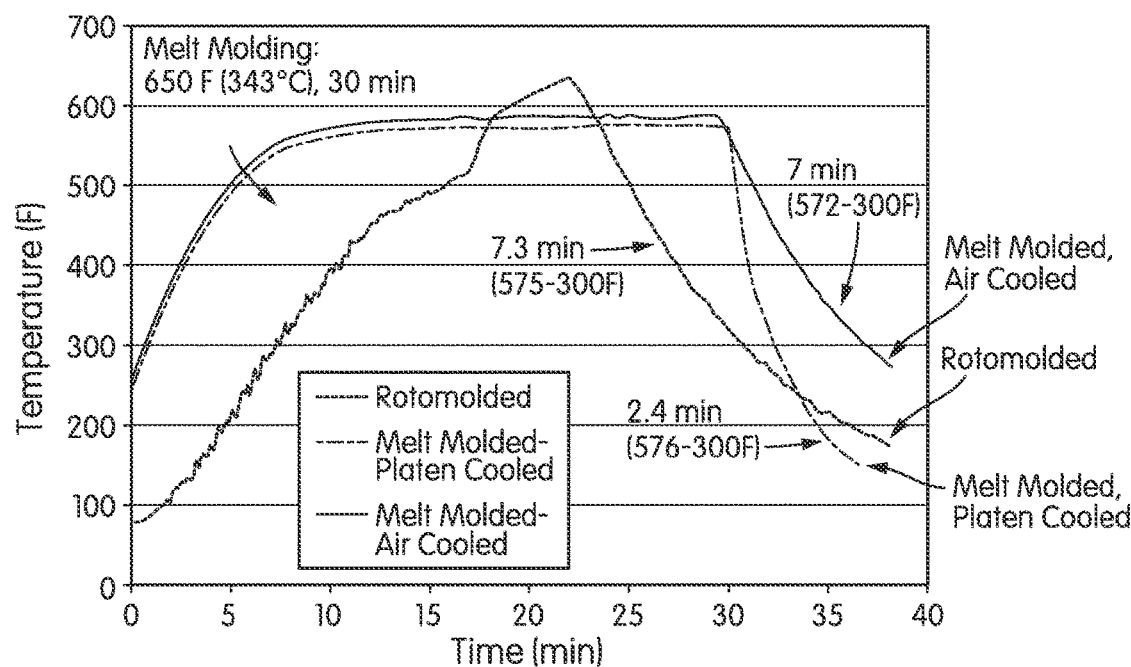
FIG. 5 illustrates temperature profiles for various fabrication processes of PEKK parts.

As indicated earlier, initial fusion tests revealed that temperatures close to 625° F. (329° C.) should be appropriate. Because of this, the internal air temperatures (PIAT) in these rotomolding studies were kept within the 620-660° F. (327° C.-349° C.) range. Temperature effects appear to have a major influence in the impact performance of the resulting part. When comparing various fabrication processes, it is evident that the cooling and heating processes are dramatically different. This is illustrated in FIG. 5 where the temperature profile of a traditional rotomolding cycle is compared to that observed for samples prepared by the melt molding processes described above and in FIG. 1. In this case, two melt molding processes are included. The "Platen Cooled" process includes immediate transfer of the molded piece from a hot press or heated metal platens to a cold press or unheated platens after a certain fusion time (in this case 30 minutes). In contrast, the "Air Cooled" process includes removing the molded piece from the hot press and allowing it to cool down simply by exposure to ambient conditions. As seen in FIG. 5, the heating and cooling rates are dramatically different among these processes.

The results suggest that PEKK samples produced by all these fabrications processes display clear differences in their impact properties. PEKK parts produced with a traditional rotomolding process show an impact value within 5-25 in-lbs. In contrast, values of around 80 in-lbs are observed in melt molded samples using the "Platen Cooled" process, while values within 100-120 in-lbs have been observed in "Air cooled" melt molded PEKK parts.

Figure 6:
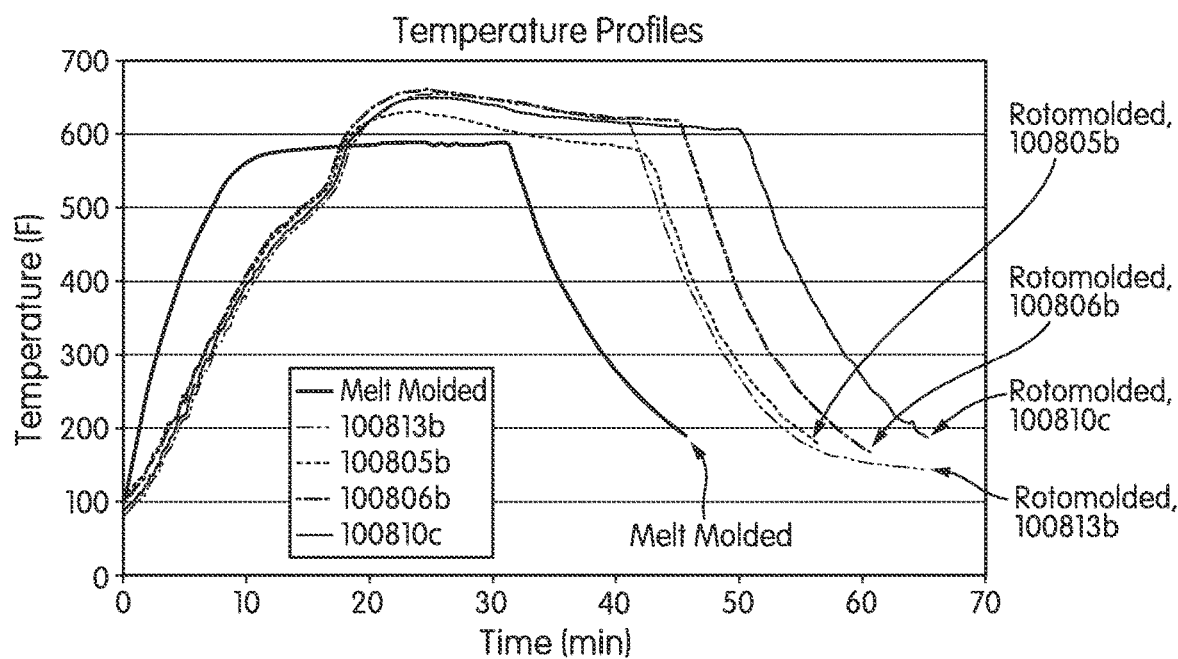
FIG. 6 illustrates temperature profiles for the production of PEKK parts using rotomolding processes of the present invention compared to a melt molding process.

Temperature profiles (heating and cooling cycles) can be specifically controlled and tuned to enhance the impact properties and appearance of a rotomolded part. Maximizing the exposure of the PEKK powder to high temperatures during rotomolding promotes increases in the final impact properties and in the overall appearance. Examples of temperature profiles used to produce PEKK rotomolded parts according to the present invention, compared to a melt molding process, are shown in FIG. 6.

The modification of the temperature profile in rotomolding promotes parts with enhanced impact properties. Samples produced by this route display impact values close to 50 in-lbs, which in some cases represent 2, 3 or even 5 times the traditional value obtained in PEKK parts produced by a conventional rotomolding process. The impact performance of these samples is summarized in Table 1 below.

TABLE 1

| Sample Description | Process | Time above 550° F. (288° C.) (min) | Impact resistance (in-lbs) |
|---|---|---|---|
| Melt molded | Air cooled | 33.4 | 95 |
| Rotomolded 100719b | Traditional Rotomolding | 8.5 | <10 |
| Rotomolded 100813b | Rotomolding of the present invention | 24.6 | 48 |
| Rotomolded 100805b | | 25.6 | 46 |
| Rotomolded 100806b | | 28.5 | 44 |
| Rotomolded 100810b | | 33.9 | 50 |

Figure 7:
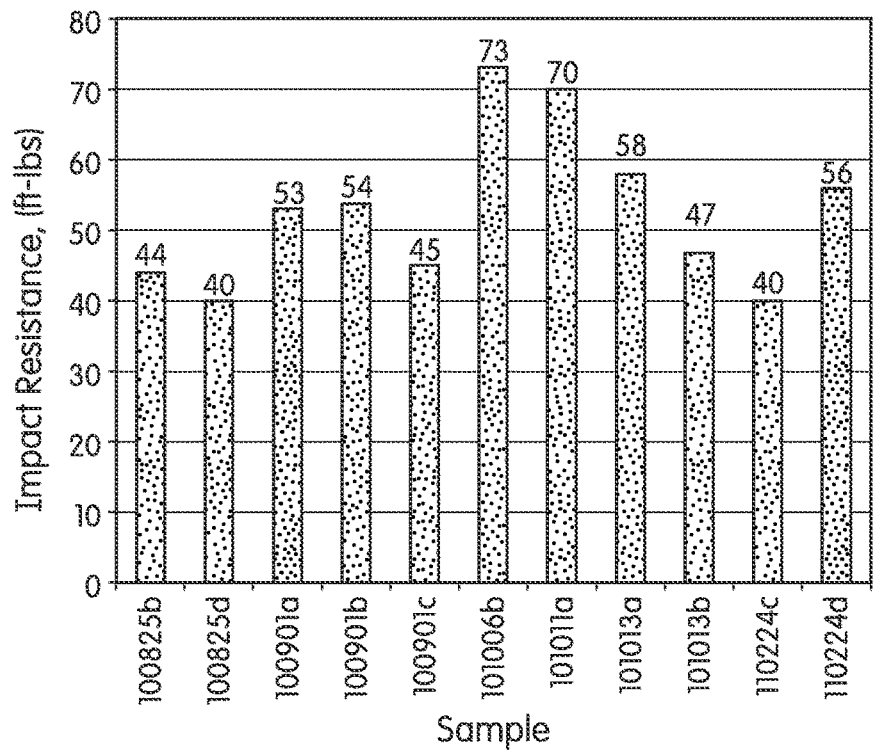
FIG. 7 provides impact resistance data of several PEKK parts produced according to rotomolding processes of the present invention.

It is important to point out that despite the highly dynamic nature of the rotomolding process, very consistent properties are obtained among samples produced by processes of the present invention. Additional examples of impact resistance data obtained from parts produced by rotomolding processes of the present invention are shown in FIG. 7 (e.g., between about 40 in-lbs to about 73 in-lbs). In some cases, the impact value approaches 75 in-lbs, which represents about 2× over the suggested impact requirement of 35 in-lbs. The present invention also contemplates impact values greater than 75 in-lbs.

Figure 8:
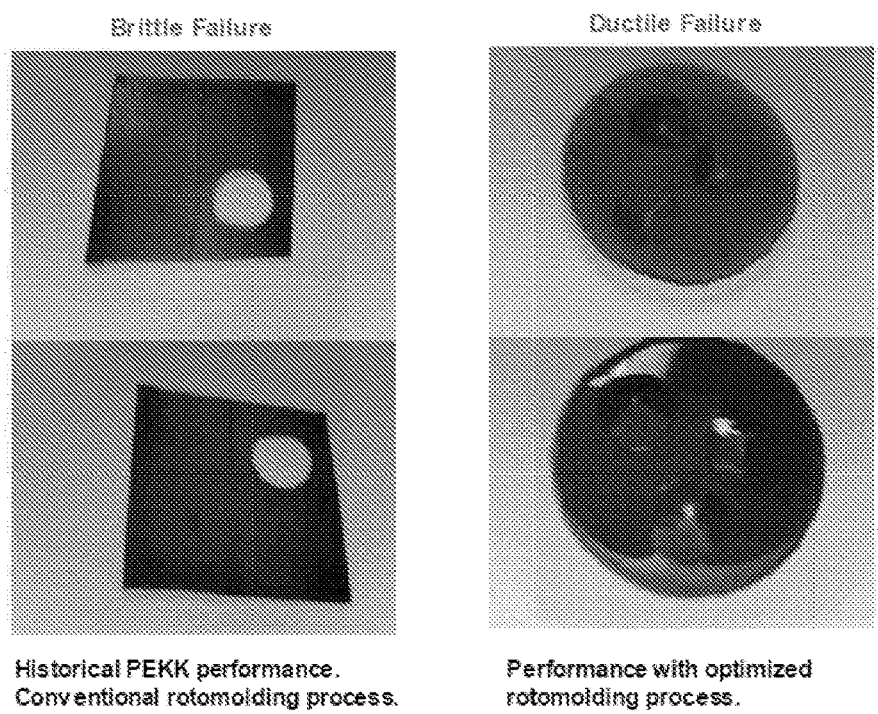
FIG. 8 compares failure mechanisms observed in PEKK parts produced by conventional rotomolding processes and by rotomolding processes of the present invention.

As depicted in FIG. 8, in addition to the improved impact resistance, samples produced by rotomolding processes of the present invention display a clear ductile failure behavior under impact testing. This performance is far superior over historical data or traditional performance obtained in PEKK parts where a highly brittle behavior after impact is observed.

Example 3

Bulk Density

Figure 9:
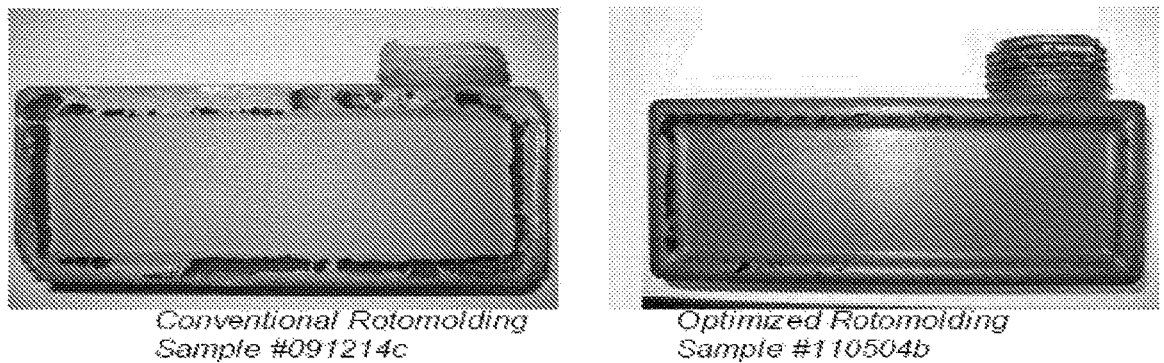
FIG. 9 compares the appearance of rotomolded parts produced from PEKK flake by conventional rotomolding processes and by rotomolding processes of the present invention.

Bulk density is an extremely important parameter to improve the wall coverage and overall properties of a rotomolded part. Powder properties such as particle size, shape, and particle size distribution strongly influence the resulting appearance of a rotomolded part. For PEKK, experiments were conducted using reactor flake with a bulk density of approximately 170 g/L. The resulting part displayed poor wall coverage, which is believed to be due to the low bulk density of the powder, the high viscosity of the polymer, and the large particle size of the flake. This is shown in FIG. 9 for parts produced using a square tank mold (8"×3.5"×3.5"). In general, the flake appears to be too coarse for complete wall coverage. However, as shown in FIG. 9, the morphology is greatly improved with one of the rotomolding processes of the present invention described earlier. The appearance of the part obtained with a process of the present invention is dramatically increased and the resulting part has improved coverage and mold definition.

Additional benefits in the rotomolding of pure PEKK flake have been observed with the use of low viscosity (high MVI) PEKK powders (Arkema PEKK SP P500, Lot P11SP009). In this case, the improvements in appearance are perhaps related to the better flowability of this resin caused by its lower viscosity and molecular weight.

Figure 10:
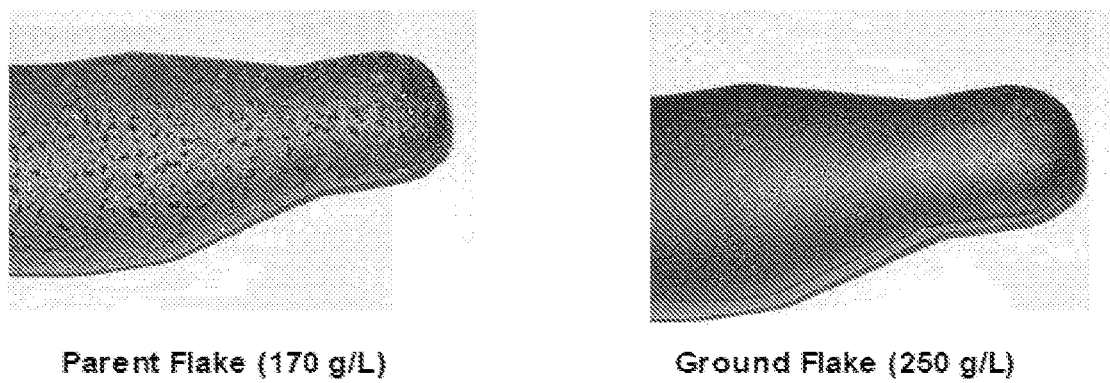
FIG. 10 compares the appearance of samples produced with powders of different bulk density.

Better results in the final appearance of a rotomolded part are typically obtained by further increases in the bulk density. This can be typically obtained by grinding the reactor flake into a finer powder, which results in a powder material with a typical bulk density of approximately 250 g/L. Laboratory scale equipment, such as a Hokosawa Hammer Mill, has been effective for the grinding of PEKK powders with bulk densities below 200 g/L. Even though pseudo-amorphous PEKK grades were used in these experiments, the results should also be satisfactory for the grinding of semi-crystalline PEKK powders when the bulk density falls within this range. An example of the improvement in wall coverage obtained with a higher bulk density powder (ground flake) is shown in FIG. 10.

Figure 11:
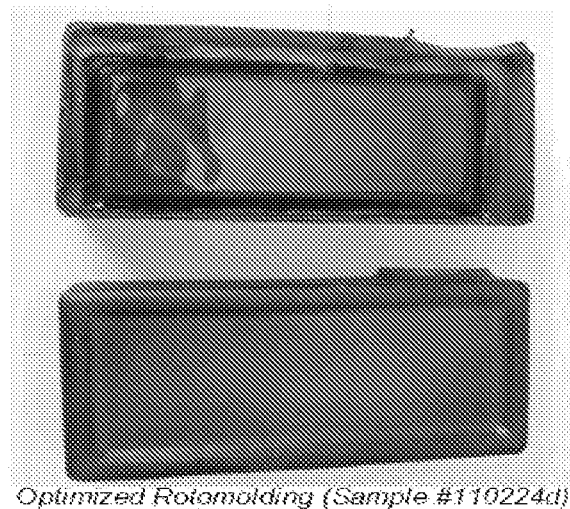
FIG. 11 illustrates the appearance of a sample produced from ground PEKK pellets (408 g/L) using a rotomolding process of the present invention.

Better results are observed when the powder bulk density is further improved, particularly at or above 400 g/L (e.g., between about 400 g/L to about 700 g/L). Parts produced with this material display good mold replication and satisfactory wall coverage due to the increased flow of the parent powder. A powder with these characteristics can also be obtained directly from grinding operations, however laboratory scale grinding processes might be slightly complicated. The ductility of a pseudo-amorphous PEKK grade makes the grinding process extremely challenging and more sophisticated grinding operations might be required. With laboratory scale equipment, grinding from PEKK pellets facilitates the production of the desired powder. An image of a final part resulting from a powder with a bulk density of approximately 408 g/L is shown in FIG. 11.

In addition to the improved appearance, the overall impact properties are also improved with a process of the present invention, as described in the previous section. A summary of the conditions and properties of these samples is shown in Table 2 below.

TABLE 2

| Sample | 09121 | 110504b | 110224d |
|---|---|---|---|
| PEKK source | Grou | Ground flake | Ground pellets |
| Oven temp #1 (° F.) | 750 | 775 | 775 |
| Oven Time #1 (min) | 22 | 20 | 20 |
| Oven temp #2 (° F.) | — | 625 | 625 |
| Oven Time #2 (min) | — | 15 | 15 |
| Cooling #1 | Air | water | Water |
| Cooling #2 | — | air | Air |
| PIAT (° F.) | 597 | 641 | 667 |
| Impact (in-lbs) | <10 | 17 | 56 |

Example 4

Use of Flow Agents

Surface imperfections commonly appear in rotomolded parts, especially with highly viscous materials. For PEKK, most of these appear in the form of pin holes, which are generally caused by high resin viscosity and are commonly observed in sections with complex geometry. These include sections where the inside radii of the mold is pronounced or in thin wall regions. These issues are addressed by introducing flow agents to facilitate flow of high viscosity resins especially on inside radii, such as those found around molded inserts and molded-in threads.

Figure 12:
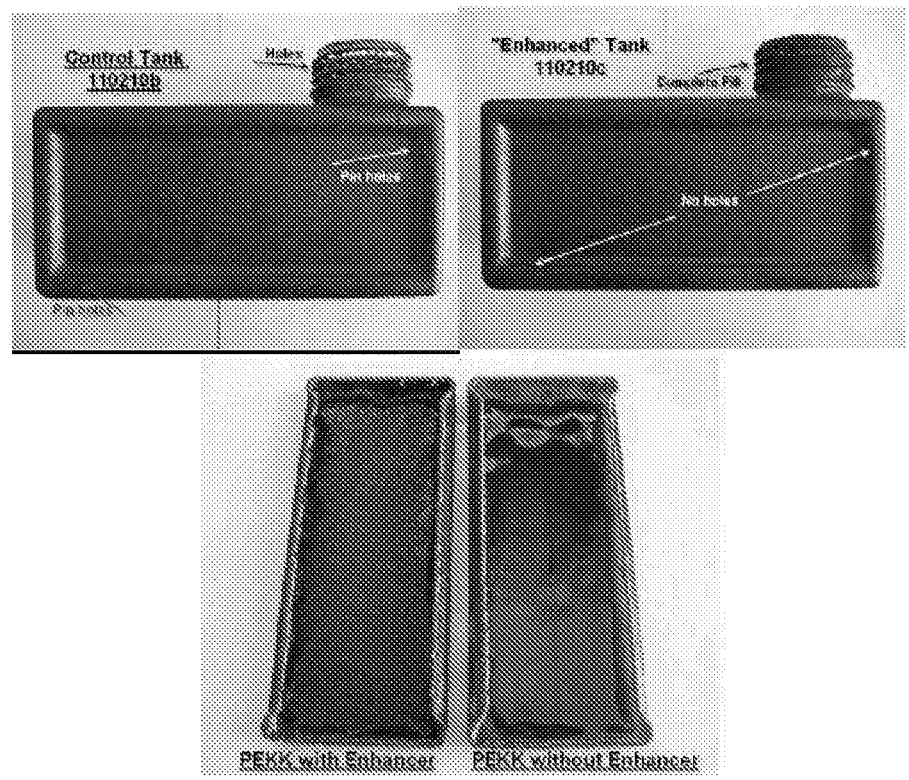
FIG. 12 compares the appearance of samples produced with and without the use of flow enhancers.

As shown in FIG. 12, rotomolding experiments in the presence of small amounts of flow agent following a rotomolding process described above suggest clear improvements in the final appearance of the part. The images shown in FIG. 12 illustrate the improvements in appearance obtained with the use of a flow agent. As observed, surface imperfections are greatly reduced and parts processed with a flow agent show a significantly reduced number of surface imperfections or pin holes. However, it is important to note that addition of excess flow agent might have a direct effect on the impact properties of the part. Marginal impact has been observed in samples produced with large amounts of flow agent.

Example 5

Production of Large Scale Rotomolded Parts

Production of large scale parts in rotomolding represents a challenge, especially when dealing with high viscosity and poor flow materials like aromatic polyketones. Of specific interest is the influence of processing conditions over the thickness control in large specimens. Uniform wall coverage or wall thickness is critical since it has a direct effect on the overall impact performance of the resulting part.

The rotomolding processes of the present invention have been successfully implemented for the production of large scale parts. Experiments to produce large scale PEKK parts with a 0.050-0.060" thickness were conducted using a modified rotomolding mold with dimensions of 24"×15"×4". The mold was sanded prior to use to insure good surface finish. Experiments included powder obtained from PEKK pellets (OXPEKK® SP, Lot M166) with a bulk density above 400 g/L. The resulting part shown in FIG. 13 displayed a very homogeneous wall thickness. Precise thickness control over the entire dimensions of the part has been obtained through the manipulation of rotational speeds in the rotomolding machine.

Although the present invention has been described in connection with specific embodiments, it should be understood that the invention as claimed should not be unduly limited to such specific embodiments. Indeed, various modifications and variations of the described compositions and methods of the invention will be apparent to those of ordinary skill in the art and are intended to be within the scope of the appended claims.

What is claimed is:

1. A method of manufacturing an article comprising:
    Rotomolding polymer comprising polyetherketoneketone (PEKK) under conditions effective to produce a rotomolded article having an impact value of at least 35 in-lbs at a thickness of 0.05 inches to 0.06 inches,
    Wherein the rotomolding comprising the steps of (i) placing powder having a bulk density of at least about 250 g/L to about 700 g/L comprising PEKK polymer into a mold and optionally one or more flow agents and/or one or more release agents, (ii) heating the mold and (iii) then cooling the mold, wherein a rotomolding temperature profile of internal air in the mold during heating is controlled by substantially maintaining heating of the mold while the mold is rotated for a period of time after internal air temperature of the mold reaches a highest melting point of the polymer and prior to initiating cooling.

2. A method of manufacturing an article according to claim 1, wherein the polymer further comprises polymer selected from the group consisting of polyetheretherketone (PEEK), polyetherketone (PEK), polyetherketoneetherketoneketone (PEKEKK), and mixtures thereof.

3. A method of manufacturing an article according to claim 1 comprising heating the mold for at least about 10 minutes after the internal air temperature of the mold reaches the highest melting point of the polymer.

4. A method of manufacturing an article according to claim 1 comprising maintaining the internal air temperature of the mold within about 75° F. of the highest melting point of the polymer for at least about 10 minutes.

5. A method of manufacturing an article according to claim 1 comprising maintaining the internal temperature of the mold at above 550° F. for at least above 10 minutes.

6. A method of manufacturing an article according to claim 1 comprising maintaining the internal air temperature of the mold at above 600° F. for at least about 10 minutes.

7. A method of manufacturing an article according to claim 1 comprising maintaining the internal air temperature of the mold at above 600° F. for between about 20 minutes to about 30 minutes.

8. A method of manufacturing an article according to claim 1, wherein the powder comprises ground PEKK pellets.

9. A method of manufacturing an article according to claim 1, wherein the powder comprises ground PEKK pellets having a bulk density of between about 400 g/L to about 700 g/L.

10. A method of manufacturing an article according to claim 1 further comprising adding one or more flow agents to the mold.

11. A method of manufacturing an article according to claim 1 further comprising adding one or more mold release agents to the mold.

12. A method of manufacturing an article according to claim 1, wherein the powder comprises ground PEKK pellets having a bulk density of between about 400 g/L to about 450 g/L.

13. An article formed according to the method of claim 1.

* * * * *